United States Patent
Simmonds et al.

(10) Patent No.: US 12,504,006 B2
(45) Date of Patent: Dec. 23, 2025

(54) GAS DISTRIBUTOR FOR ELECTRIC PROPULSION SYSTEMS

(71) Applicant: CALIFORNIA INSTITUTE OF TECHNOLOGY, Pasadena, CA (US)

(72) Inventors: Jacob B. Simmonds, Pasadena, CA (US); Robert B. Lobbia, Pasadena, CA (US); Richard R. Hofer, Monrovia, CA (US); Dan M. Goebel, Tarzana, CA (US); Leanne Su, Ann Arbor, MI (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 19/190,683

(22) Filed: Apr. 27, 2025

(65) Prior Publication Data

US 2025/0354541 A1      Nov. 20, 2025

Related U.S. Application Data

(60) Provisional application No. 63/648,786, filed on May 17, 2024.

(51) Int. Cl.
  *F03H 1/00*      (2006.01)
  *B23B 35/00*      (2006.01)

(52) U.S. Cl.
  CPC ........... *F03H 1/0037* (2013.01); *B23B 35/00* (2013.01)

(58) Field of Classification Search
  CPC .... F03H 1/0012; F03H 1/0037; F03H 1/0062; F03H 1/0068; F03H 1/0075; B64G 1/411; B64G 1/413; B64G 1/415; B64G 1/417
  See application file for complete search history.

(56) References Cited

U.S. PATENT DOCUMENTS

| | | | | |
|---|---|---|---|---|
| 3,757,518 A | * | 9/1973 | Bahr | H01J 27/16 315/39 |
| 5,475,354 A | * | 12/1995 | Valentian | F03H 1/0075 315/111.41 |

(Continued)

FOREIGN PATENT DOCUMENTS

| | | | | |
|---|---|---|---|---|
| JP | 2017516021 A | * | 6/2017 | F03H 1/0075 |
| WO | WO-9737517 A2 | * | 10/1997 | F03H 1/0075 |

(Continued)

OTHER PUBLICATIONS

Hofer R. R. et al., "The H10 High Power Density Hall Thruster" *The 38th International Electric Propulsion Conference*, Jun. 2024, pp. 1-25.

(Continued)

*Primary Examiner* — Craig Kim
(74) *Attorney, Agent, or Firm* — Steinfl + Bruno LLP

(57) ABSTRACT

Systems and methods for a low cost and simple to manufacture gas distributor for use as an anode in an electric propulsion (EP) system are presented. According to one aspect, the gas distributor is a single integrated structure made of a single material, including graphite or steel. The gas distributor includes an annular shape with axial symmetry about a center axis. The gas distributor includes an upstream gas channel region and a downstream gas diffuser region. The gas channel region includes a circumferential hollow region, and two sets of axial holes arranged at respective radial positions. A radial cross section of the gas distributor includes an upstream opening corresponding to the hollow region of the gas channel region and a downstream triangular shape corresponding to the gas diffuser region. A radial extension of the triangular shape axially interferes with the two sets of axial holes.

22 Claims, 9 Drawing Sheets

(56) References Cited

U.S. PATENT DOCUMENTS

| | | | | |
|---|---|---|---|---|
| 5,581,155 | A * | 12/1996 | Morozov | F03H 1/0075 315/111.41 |
| 5,847,493 | A * | 12/1998 | Yashnov | F03H 1/0075 313/361.1 |
| 5,892,329 | A * | 4/1999 | Arkhipov | F03H 1/0075 60/202 |
| 6,075,321 | A * | 6/2000 | Hruby | F03H 1/0075 60/202 |
| 6,281,622 | B1 * | 8/2001 | Valentian | F03H 1/0031 315/501 |
| 7,116,054 | B2 * | 10/2006 | Zhurin | H01J 27/146 315/111.41 |
| 7,164,227 | B2 * | 1/2007 | de Grys | F03H 1/0075 313/361.1 |
| 8,704,444 | B2 * | 4/2014 | Marchandise | F03H 1/0012 315/111.41 |
| 10,273,944 | B1 * | 4/2019 | Huang | F03H 1/0012 |
| 12,006,922 | B1 * | 6/2024 | Gray | F03H 1/0012 |
| 12,384,563 | B1 * | 8/2025 | Wang | F03H 99/00 |
| 2006/0290287 | A1 * | 12/2006 | Kuninaka | F03H 1/0075 315/111.61 |
| 2019/0168895 | A1 * | 6/2019 | Conversano | F03H 1/0075 |
| 2024/0401576 | A1 * | 12/2024 | Oh | F03H 1/0062 |
| 2025/0098058 | A1 * | 3/2025 | Mattausch | H05H 1/54 |

FOREIGN PATENT DOCUMENTS

| | | | | |
|---|---|---|---|---|
| WO | WO-2009061289 A2 * | 5/2009 | | F02K 9/08 |
| WO | WO-2013117856 A1 * | 8/2013 | | F03H 1/0075 |

OTHER PUBLICATIONS

Simmonds J. B. et al., "Thermal Management and Krypton Performance of the H10 High Power Density Hall Thruster" *The 38th International Electric Propulsion Conference*, Jun. 2024, pp. 1-12.

* cited by examiner

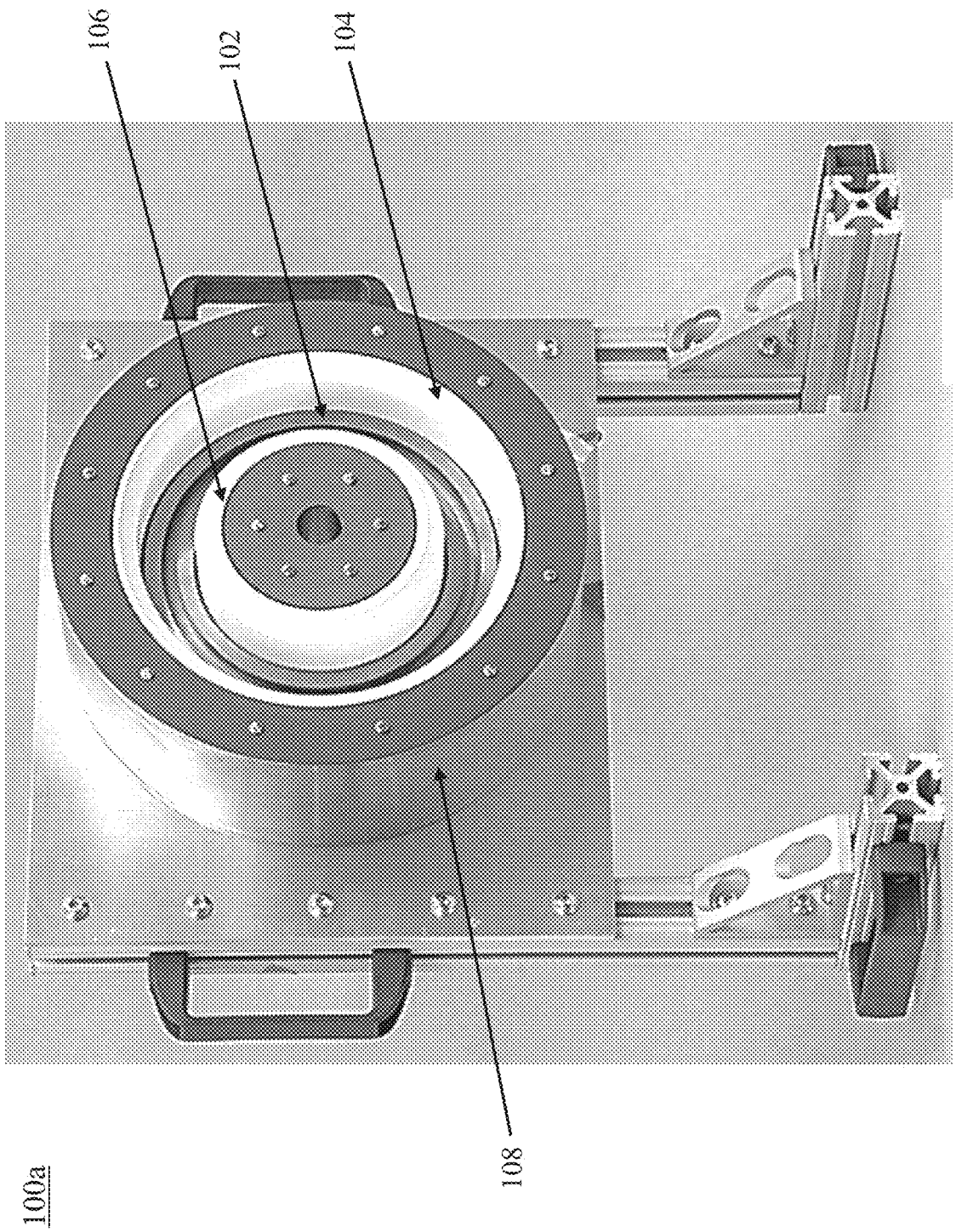
FIG. 1A  *Prior Art*

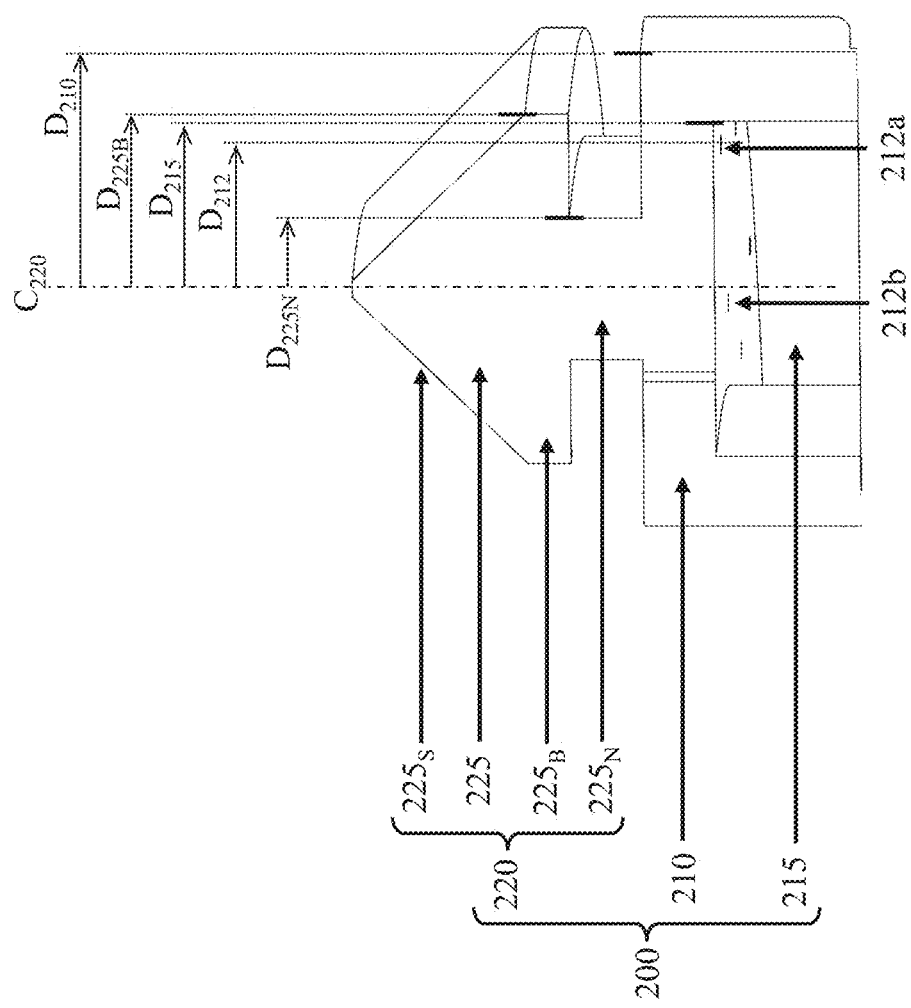

GAS DISTRIBUTOR FOR ELECTRIC PROPULSION SYSTEMS

CROSS REFERENCE TO RELATED APPLICATIONS

The present application claims priority to and the benefit of U.S. provisional patent application Ser. No. 63/648,786 entitled "Simple Gas Distributor for Hall Thrusters", filed on May 17, 2024, the disclosure of which is incorporated herein by reference in its entirety. 1

STATEMENT OF GOVERNMENT GRANT

This invention was made with government support under Grant No. 80NM0018D0004 awarded by NASA (JPL). The government has certain rights in the invention.

TECHNICAL FIELD

The present disclosure relates to electric propulsion systems. More particularly, it relates to a low cost and simple to manufacture gas distributor/diffuser for provision of high azimuthal and radial diffusion of propellant flow, and which can be fabricated to operate at high temperatures.

BACKGROUND

Gas distributors for Electric Propulsion (EP) systems (e.g., Hall effect thrusters, gridded ion thrusters) require delivery of (propellant) gas with a high degree of azimuthal symmetry, while operating at temperatures typically about 600° C. (degrees Celsius). Given the low flow rates and gas densities that may be required in a discharge chamber of such EP systems, the azimuthal symmetry of the gas flow is very difficult to achieve and typically requires a gas distributor having a series of very small outlet holes (orifices) and several layers of material that in combination choke the gas and allow it to spread with azimuthal symmetry.

Conventional gas distributors (e.g., diffusers) for EP systems are often fabricated as a (sub-) assembly that includes several layers/stacks of metallic rings, typically steel, that are welded together, wherein each of the rings contains dozens of holes and a ring-shaped deceleration region referred to as an annulus. Due to the complexity of such an assembly, conventional gas distributors are typically very expensive to fabricate and have long lead times. Furthermore, the power density in EP systems is often limited due to temperature limitations of the gas distributor per se, which is determined by the material limits of the metals used to fabricate the annuli.

Teachings according to the present disclosure address the above challenges in manufacturing and limitations in operating temperatures of gas distributors via a cost effective and simple to manufacture gas distributor design that may be fabricated with a material withstanding a temperature of up to 3000° C.

SUMMARY

The present disclosure describes a low cost and simple to manufacture gas distributor for provision of high azimuthal and radial diffusion of propellant flow, and which can be fabricated to operate at high temperatures. The gas distributor according to the present disclosure may be fabricated from graphite. Accordingly, because the gas distributor assembly/structure may also serve as the anode of the EP system (e.g., Hall thruster), use of graphite may allow a target EP system to operate at an anode temperature of 600° C. or more above the state of practice while radiating a higher portion of thermal energy away from the EP system thanks to the higher emissivity of the graphite. Accordingly, the gas distributor described in the present disclosure may allow a target EP system to operate at higher power densities.

Furthermore, the difficulty in machining the complex shapes of conventional gas distributor (and therefore anode) designs in graphite has been solved through a new geometry presented herein, and which allows machining/fabricating of a gas distributor (and therefore anode) at a very low cost. Thanks to the low part count and the low density of graphite, which is less than a third of the density of steel, the present design results in a very low mass gas distributor (and therefore anode) assembly when compared to assemblies based on conventional designs.

According to a first aspect of the present disclosure, a gas distributor for an electric propulsion system is presented, comprising: an annular structure with axial symmetry about a center axis, the annular structure comprising an upstream gas channel region comprising a circumferential hollow region and two sets of holes circumferentially arranged at two radial positions; and a downstream gas diffuser region comprising a triangular shaped radial cross section that radially extends through the two radial positions.

According to a second aspect of the present disclosure, a method for fabricating a gas distributor for an electric propulsion (EP) system is presented, the method comprising: providing an annular block made from a single material, the annular block comprising an axial symmetry about a center axis and a square radial cross section axially extending from a bottom upstream end to a top downstream end of the annular block; cutting the top upstream end of the annular block at an angle, thereby forming a triangular radial cross section; cutting inner and outer slots in a medial region of the annular block, thereby forming a rectangular cross section having a radial extension that is contained within a radial extension of the triangular radial cross section; cutting out an annulus from the bottom upstream end of the annular block, thereby forming a hollow region having a cross section that contains the radial extension of the rectangular cross section; drilling holes through the hollow region, thereby forming an inner ring of holes and an outer ring of holes; and based on the drilling, finalizing the fabricating of the gas distributor.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure. Same reference designators refer to same features.

FIG. 1A shows a picture of a prior art electric propulsion (EP) system.

FIG. 2C shows further details of the gas distributor of FIG. 2A and FIG. 2B, including details related to channeling and distribution of gas.

DETAILED DESCRIPTION

Figure 1B:
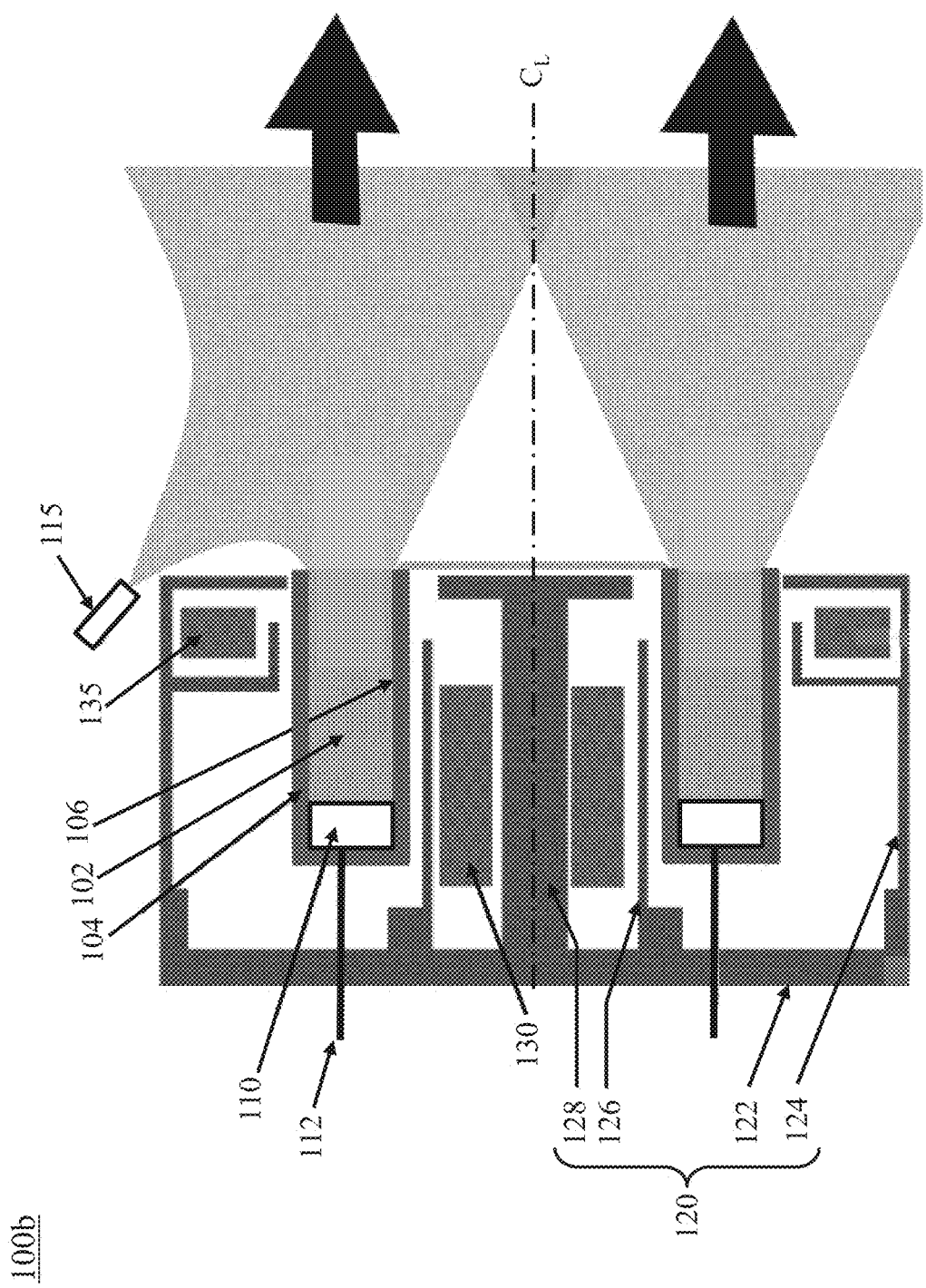
FIG. 1B shows a simplified cross-sectional schematic of the EP system of FIG. 1A.

FIG. 1A shows a picture of a prior art electric propulsion (EP) system (100a). As shown in FIG. 1A, the EP system (100a) may include an axial symmetry about a center axis (e.g., $C_L$ of FIG. 1B, centerline) about which (annular) elements of the EP system (100a) may be arranged. These include, for example, a discharge chamber (102) laterally bounded by outer wall (104) and inner wall (106) that may be made from insulating and/or conductive material. Within the inner space of the discharge chamber (102), propellant ions may be accelerated via electric fields (e.g., Hall effect or electric grid electrodes) produced in the EP system (100a). Operation of the EP system (100a) may be further based on magnetic field lines produced within the inner space of the discharge chamber (100a) according to methods and techniques known to a person skilled in the art. FIG. 1B shows further details of internal elements of the prior art EP system (100a) for an exemplary case of a Hall thruster.

As shown in FIG. 1B, within the inner space of the annular discharge chamber (102) bounded by walls (104, 106), an anode/gas distributor (110) coupled to an inlet (112) for feeding of propellant gas may be provided. In conjunction with the anode/gas distributor (110), a cathode neutralizer (115) may be provided, so that a voltage applied between the anode (e.g., 110) and the cathode (115) may generate free electrons within the discharge chamber (102) that may be accelerated by an (axial) electric field formed in the discharge chamber (102). A magnetic circuit (120) made of a magnetic material (e.g., soft magnetic material) may connect an inner magnetic coil (130) and an outer magnetic coil (135) so to provide, within the inner space of the discharge chamber (102), a radial magnetic field that is perpendicular to the electric field produced between the anode (e.g., 110, positive electrode, also serves as gas distributor) and the cathode (115, negative electrode). It should be noted that in some implementations, the cathode (115) may be arranged centrally within a region/cavity formed where element (128) is shown. Furthermore, in some implementations, the inner/outer magnetic coils (130, 135) may include or be replaced with permanent magnets, such as, for example, annular magnets to produce the radial magnetic field in (or about) the discharge chamber (102).

In the discharge chamber (102), a combination of the radial magnetic field and the axial electric field may cause the electrons to drift in azimuth thus forming a Hall current that may include circulating high-energy electrons. In turn, such high-energy electrons may bombard (e.g., collide with) propellant atoms input into the discharge chamber (102) and accordingly ionize (a majority of) the propellant atoms to generate propellant ions that can accelerate axially out (as shown by large arrows in FIG. 1B) of the discharge chamber (102) under influence of the electric field produced between the anode (e.g., 110) and the cathode (115).

In an EP system, such as the exemplary Hall thruster (100), xenon may be used as a propellant gas because of its high atomic weight and low ionization potential. However, other materials can be used as propellants, such as, for example, krypton, argon, iodine, bismuth, magnesium, or zinc. In particular, recent developments have shown that alternate propellants for EP systems, such as, for example, krypton or argon, require higher power densities than that of xenon, which results in higher anode temperatures, including temperatures that may be greater than the melting temperature of a material (e.g., steel) used to fabricate the anode (and therefore the gas distributor).

The gas distributor (e.g., diffuser, integrated with the anode) disclosed in the present disclosure removes the anode as a limiting factor for operation of the EP system at such higher power densities, thereby facilitating the use of alternate propellants to achieve operation at such higher power densities. Benefits of a higher power density include larger throttling ranges for both specific impulse and thrust produced by the EP system, which may be considered as prerequisites for deep space missions. In particular, thanks to its simplicity in design and ease of fabrication/manufacturing, flexibility in choice of a material for fabrication of the gas distributor according to the present disclosure may be provided. In turn, such flexibility may be used to select a material having properties, such as melting temperature and/or emissivity, according to a use case, such as propellant choice, expected high operating temperatures at the anode, and/or thermal control/management features embedded in the EP system.

Accordingly, the gas distributor according to the present disclosure may be fabricated, for example, from steel for typical (lower) temperature applications (e.g., less than 600° C.), and from graphite for novel (higher) temperature applications (e.g., greater than 1000° C., such as, e.g., 3000° C.), both such implementations resulting in reduction in cost, size and weight. It is noted that steel and graphite should not be considered as limiting the scope of what the inventors of the present application consider as the invention, as other conductive materials with suitable properties according to a use case may be chosen. For example, for higher temperature applications, the gas distributor according to the present disclosure may be fabricated (e.g., made) from conductive material different from graphite, such as, for example, silicon carbide, and/or high temperature metals such as molybdenum or tungsten.

Thanks to its simplicity in design and ease of fabrication/manufacturing, teachings according to the present disclosure may allow significant reduction in the cost of the gas distributor, a critical component of an EP system, by 80-90% relative to the state-of-the-art multi-layer design.

It is noted that in the present disclosure, unless otherwise specified, the expressions "gas distributor", "gas diffuser", and "anode" may be considered as referring to a same dual-purpose part of an EP system that provides functionalities of a positive electrode for provision of an accelerating electric field, and of gas distribution for provision of azimuthally symmetric gas flow, in the discharge chamber.

Figure 2A:
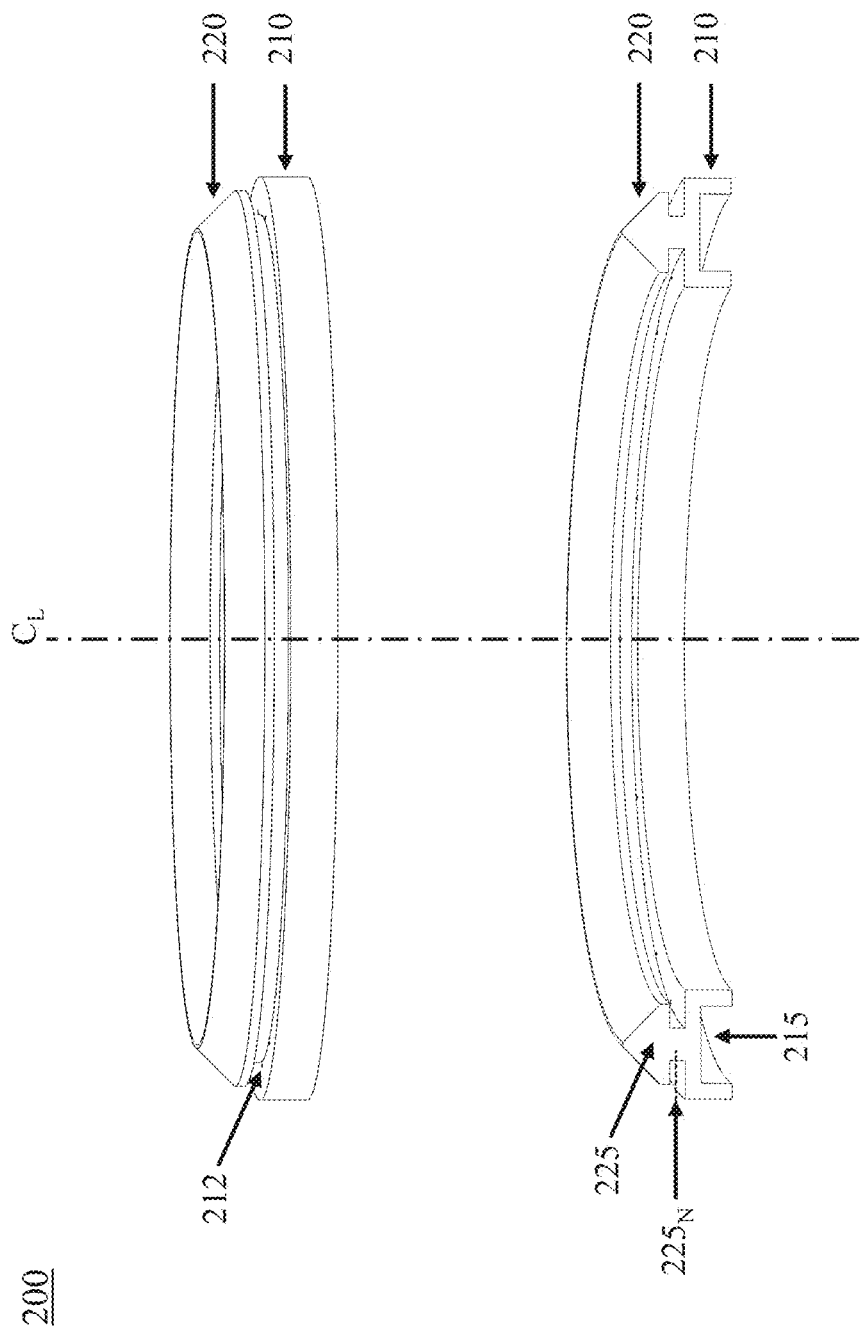
FIG. 2A shows (simplified) isometric and cross-sectional views of a gas distributor according to an embodiment of the present disclosure.

FIG. 2A shows (simplified) isometric and cross-sectional views of a gas distributor (200) according to an embodiment of the present disclosure. In particular, the top of FIG. 2A shows an isometric side view of the gas distributor (200) and the bottom of FIG. 2A shows a corresponding cross-sectional view. As later described in the present disclosure, all functional elements of the gas distributor (200), including elements (210, 212, 215, 215$_N$, 220, 225) shown in FIG. 2A, may be fabricated/machined from a single (solid) annular shape (e.g., annulus). Alternatively, all such parts, or groups of such parts, may be bonded to one another via known techniques, including via additive and/or subtractive manufacturing techniques that can provide atomic bonds. Accordingly, any two or more of said functional elements may be formed as one monolithic structure.

As shown in FIG. 2A, the gas distributor (200) includes an annular shape/profile about a centerline (C$_L$, e.g., centerline of the EP system). The gas distributor (200) includes a gas channel region (210, e.g., gas channel, channel) and a gas diffuser region (220, e.g., gas diffuser, diffuser). In particular, the gas diffuser region (220) may be considered as arranged above the gas channel region (210), or in other words, when considered in the context of an EP system (e.g., 100 of FIG. 1), the gas channel region (210) may be considered upstream the gas diffuser region (220), or the gas diffuser region (220) may be considered downstream the gas channel region (210).

As shown in FIG. 2A, according to an embodiment of the present disclosure, the gas diffuser region (220) may include a lateral/radial extension that may be encompassed/contained within a lateral/radial extension of the gas channel region (210). In other words, and as shown in the views of the later described FIG. 2B, a projection of the gas diffuser region (220) in a plane that is orthogonal to the centerline, C$_L$, may be fully encompassed/contained in a projection of gas channel region (210) in that plane.

As shown in FIG. 2A, a (radial) cross section of the gas diffuser region (220) may include a triangular shape (225) that is joined (e.g., attached/fixed) to (a top surface of) the gas channel region (210) through a neck (225$_N$, e.g., transition, transition region). As shown in FIG. 2A, the neck (225$_N$) may include a lateral extension that is smaller than that of the triangular shape (225, e.g., base of the triangle). According to a nonlimiting embodiment of the present disclosure, the neck (225$_N$) may be centered about the triangular shape (225). It is noted that the neck (225$_N$) may be considered as part of the gas diffuser region (220), as part of the channel region (210), or as a part that is separate from the diffuser (220) and channel (210) regions. It is noted that the cross section shown in FIG. 2A may be referred to as a radial cross section relative to the center axis (C$_L$, e.g., centerline). In other words, a cross section according to a plane that includes the center axis, CL.

With continued reference to FIG. 2A, the gas channel region (210) may include a hollow region (215, e.g., chamber, channel, fluidic channel/path) that extends throughout the circumference of the gas channel region (210). Furthermore, gas channel region (210) includes a plurality of holes (212, e.g., orifices, openings) formed through the top surface of the gas channel region (210) to provide corresponding fluidic paths/communication between the channel/chamber (215) and a space surrounding the gas distributor (200), in other words, the discharge channel (e.g. 102 of FIG. 1) of a target EP system. Circumferential arrangement of the holes (212) about the gas channel region (210) is shown in FIG. 2B.

Figure 2B:
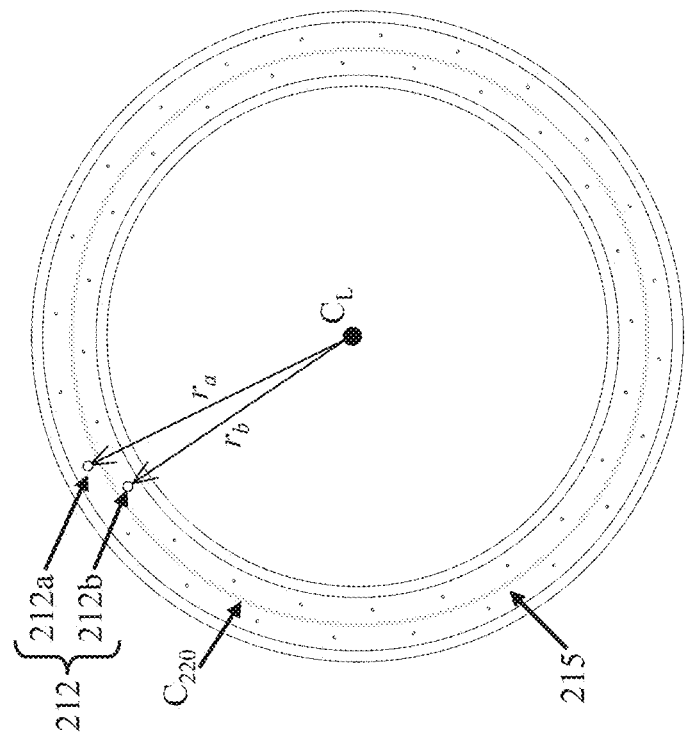
FIG. 2B shows top and bottom views of the gas distributor of FIG. 2A.
Figure 2B:
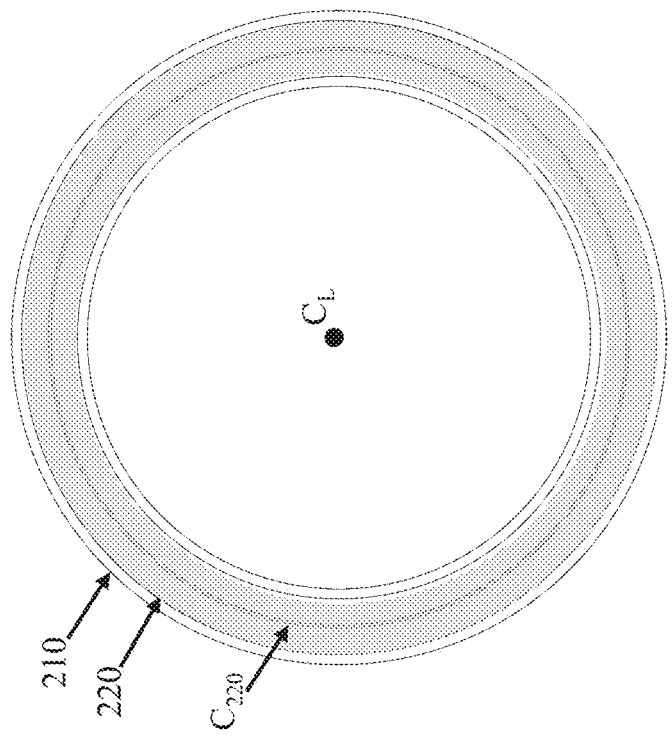

FIG. 2B shows top (left of the figure) and bottom (right of the figure) views of the gas distributor (200) according to an embodiment of the present disclosure. As shown in the top view of the gas distributor (200), the plurality of holes (212, axial holes) formed in the gas channel region (210) are masked (concealed, hidden) by the radial profile/extension of the diffuser region (220, shown with grey highlight). On the other hand, as shown in the bottom view of the gas distributor (200), the plurality of holes (212) may be circumferentially arranged about the gas channel region (210) according to two separate rings at respective radii, r$_a$ and r$_b$, from the centerline, C$_L$. Accordingly, the plurality of holes (212) may include an outer ring of holes (212a, e.g., outer holes, indicated with exaggerated dimensions) arranged at a radius, r$_a$, and an inner ring of holes (212b, e.g., inner holes, indicated with exaggerated dimensions) arranged at a radius, r$_b$, that is smaller than the radius, r$_a$.

With further reference to FIG. 2B and reference back to FIG. 2A, according to an embodiment of the present disclosure, radial arrangement of the holes (212) is such as to axially clear the neck (225$_N$) and to axially interfere (e.g., be obstructed by) the triangular shape (225, e.g., base 225$_B$ shown in FIG. 2C) of the diffuser region (220). According to an embodiment of the present disclosure, the outer ring of holes (212a) and the inner ring of holes (212b) are arranged at opposite sides of a center region (C$_{220}$, e.g., a centerline) of the gas diffuser (220). It is noted that in FIG. 2B, the center region, C$_{220}$, of the gas diffuser region (220) is shown as a circle that is contained within the gas diffuser region (220). The center region, C$_{220}$, may be likened to a cylindrical shape about the centerline, C$_L$, that passes through the center of the triangular shape (225), or in other words, as shown in FIG. 2C, through the top (downstream) vertex/tip of the triangular shape (225). Accordingly, as shown in FIG. 2C, the center region, C$_{220}$, of the gas diffuser (220) may pass through the respective centers (e.g., centerlines) of the base (225$_B$) of the triangular shape (225) and of the neck (225$_N$).

Further details of the gas distributor (200), including details related to geometries that facilitate the channeling and distribution of gas by the distributor (200) according to the present teachings are shown in FIG. 2C. These include relationships between lateral/radial extensions/dimensions of elements of the gas channel region (210) and the gas diffuser region (220), including extensions/dimensions D$_{210}$, D$_{212}$, D$_{215}$, D$_{225B}$, D$_{225N}$, respectively corresponding to the channel region (210, e.g., lateral/outer wall of the channel/chamber), the plurality of holes (212, e.g., radial positions r$_a$ and r$_b$), the channel/chamber (215, e.g., lateral/inner wall of the channel/chamber), the base (225$_B$ e.g., lateral/outer wall of the base) of the triangular shape (225), and the neck (225$_N$, e.g., lateral/outer wall of the neck).

It is noted that the dimensions (D$_{210}$, D$_{212}$, D$_{215}$, D$_{225B}$, D$_{225N}$) of FIG. 2C are shown relative to the center region, C$_{220}$, of the gas diffuser (220, i.e., gas diffuser region). According to an embodiment of the present disclosure, the center region of the gas distributor (200) may coincide with the center region, C$_{220}$. In other words, the center region, C$_{220}$, of the gas diffuser (220) may coincide with a center region of the gas channel (210, i.e., gas channel region). Accordingly, the gas distributor (200) may include radial symmetry about the center region, C$_{220}$, and angular/azimuthal/axial symmetry about the centerline, C$_L$.

It is noted that although the figures of the present disclosure may show the gas distributor (200) as including a symmetry about the centerline (C$_{220}$, i.e., center region), such symmetry should not be considered as limiting the scope of the present teachings, as designs that lack such symmetry may be envisioned so long that angular/azimuthal symmetry of the gas distributor (200) about the centerline, C$_L$, is maintained. In other words, the relationships between elements (210, 212, 215, 225$_B$, 225$_N$) as provided by the dimensions (D$_{210}$, D$_{212}$, D$_{215}$, D$_{225B}$, D$_{225N}$), such as, D$_{210}$>D$_{225B}$>D$_{215}$>D$_{212}$>D$_{225N}$, may remain true when considering extensions/dimensions on either side (inwards or outwards) of the centerline, $C_{220}$.

With continued reference to FIG. 2C, the relationships between elements (210, 212, 215, $225_B$, $225_N$) as provided by the dimensions ($D_{210}$, $D_{212}$, $D_{215}$, $D_{225B}$, $D_{225N}$), such as, $D_{210} > D_{225B} > D_{215} > D_{212} > D_{225N}$, may indicate that: a radial extension of the triangular shape (225, defined by $D_{225B}$) is contained within a radial extension of the gas channel region (210, defined by $D_{210}$); a radial extension of the hollow region (215, defined by $D_{215}$) is contained within the radial extension of the triangular shape (225, defined by $D_{225B}$); a radial position ($r_a$ or $r_b$) of the plurality of holes (212, defined by $D_{212}$) is contained within the radial extension of the hollow region (215, defined by $D_{215}$); and a radial extension of the transition region ($225_N$, defined by $D_{225N}$) is contained within the radial position of the plurality of holes (212, defined by $D_{212}$), or in other words, the radial extension of the transition region ($225_N$, defined by $D_{225N}$) is contained within a radial region that extends between the two radial positions, $r_a$ and $r_b$, of the plurality of holes (212, defined by $D_{212}$).

An exemplary symmetrical profile according to the present disclosure of the gas distributor (200) may include a symmetrical profile of the gas diffuser (220) provided by a triangular shape (225) having equal sides/slopes ($225_S$, e.g., equal length sides, isosceles triangle), and an exemplary non-symmetrical profile according to the present disclosure of the gas distributor (200) may include a non-symmetrical profile of the gas diffuser (220) provided by a triangular shape (225) having unequal sides/slopes ($225_S$, e.g., unequal lengths sides, scalene triangle). Another exemplary symmetrical profile according to the present disclosure of the gas distributor (200) may include symmetrical profiles of the gas diffuser (220) and the gas channel (210) about a common center region (e.g., $C_{220}$), and another exemplary non-symmetrical profile according to the present disclosure of the gas distributor (200) may include a center region of the gas channel (210) that is at an offset (i.e., non-coincident) with respect to the center region, $C_{220}$, of the gas diffuser (220).

It is noted that by making the downstream region (220) of the gas distributor (200) to include the triangular shape (225), downstream radial diffusion of the gas that exits the holes (212a, 212b) can be promoted by lowering an axial distance the gas must travel from an exit plane of the gas channel (210, e.g., top surface provides an exit plane for the holes) before combining radially.

According to an embodiment, a degree of symmetry in radial diffusion may be based on the triangular shape (225), including length of the two slopes ($225_S$). According to a preferred embodiment of the present disclosure, increased symmetry in the radial diffusion may be provided by making the two slopes ($225_S$) equal in length.

With further reference to FIG. 2C, pressurized (propellant) gas that is delivered into the chamber (215) is evenly spread through the chamber (215) before exhausting out of the holes (212a, 212b) into the discharge chamber (e.g., 102, not shown). As the gas exits the chamber (215), it encounters the triangular shape (225) of the gas diffuser (220) which causes the gas to divert around the base ($225_B$) and then follow the contours of the slopes ($225_S$) as the gas diffuses downstream. As the gas diffuses downstream and within the axial extension of the gas diffuser (220), the triangular shape (225) of the gas diffuser (220) promotes the gas to diffuse radially across the discharge chamber. High diffusion of the gas is reached just downstream of the vertex/tip of the triangular shape (225), or in other words, just downstream of the gas diffuser (220).

With continued reference to FIG. 2C, as the gas flows downstream the gas distributor (200, e.g., downstream the gas diffuser 220), high energy ions/plasma is formed, a portion of which may be susceptible to contact the gas distributor (200) and thereby cause some erosion. However, because in the design according to the present disclosure the axial interference of the triangular shape (225) with the holes (212) removes any direct/straight/axial flow path (e.g., line-of-sight) between the holes (212) and the downstream high energy ions/plasma, then integrity of the holes (212) can be maintained throughout operation of the EP system. In other words, the gas distributor (200) according to the present disclosure includes a built-in protection of the holes (212) against ions bombardment which allows maintaining consistency of dimensions of the holes (212, openings) throughout operation of the EP system. It is noted that most ions that may ultimately contact the holes (212) may be subjected to collisions with the surface of the triangular shape (225) and therefore may be considered low energy ions.

Figure 2D:
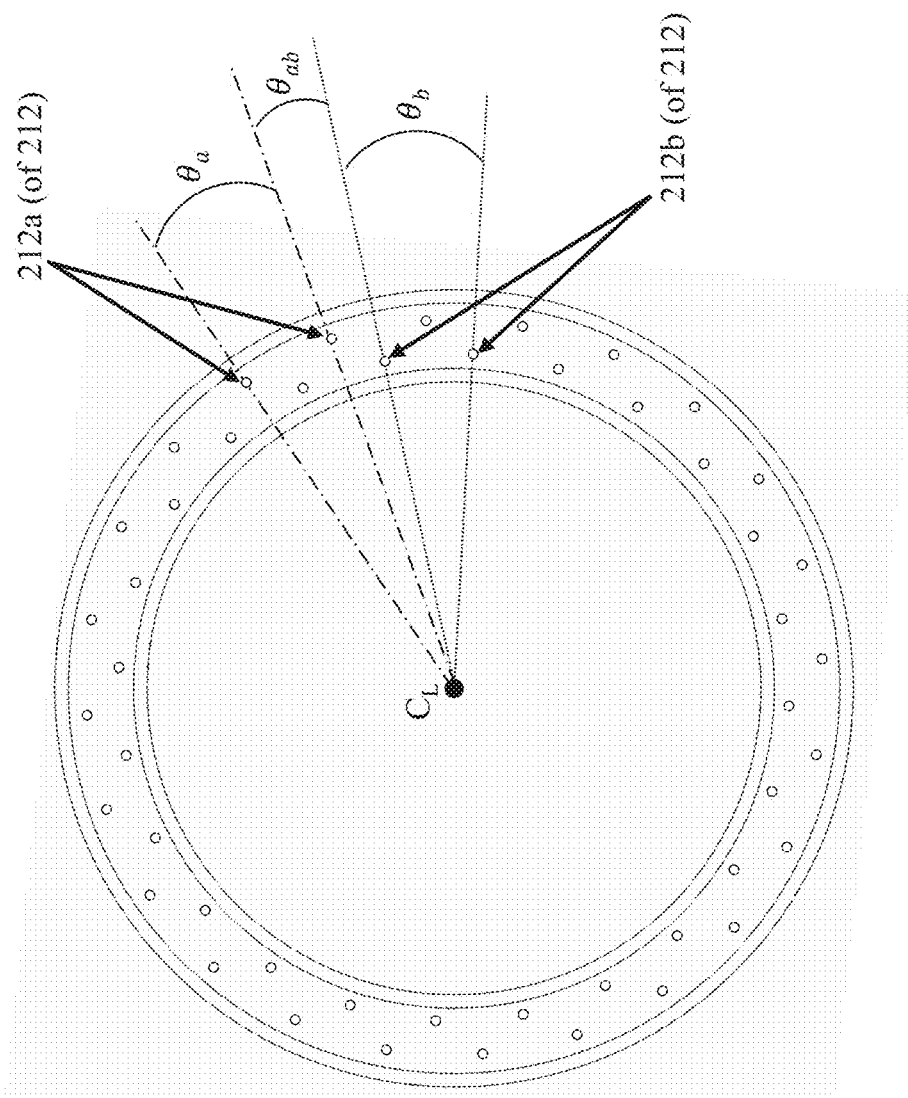
FIG. 2D shows further details of the gas distributor of FIG. 2A and FIG. 2B, including details related to the arrangement of orifices for distribution of gas.

FIG. 2D shows details related to the arrangement of the plurality of holes (212, e.g., orifices, openings) for distribution of gas into the space (e.g., discharge channel) surrounding the gas distributor (200). According to an embodiment of the present disclosure, the outer ring of holes (212a) may include a plurality of holes (e.g., 212a) that are separated by a fixed/constant length arc provided by an angle, $\theta_a$, and the inner ring of holes (212b) may include a plurality of holes (e.g., 212b) that are separated by a fixed/constant length arc provided by an angle, $\theta_b$. In other words, a relative angular distance/separation between any two adjacent outer ring holes (212a) may be provided by the angle $\theta_a$, and a relative angular distance/separation between any two adjacent inner ring holes (212b) may be provided by the angle $\theta_b$. In other words, the outer ring holes (212a) may be clocked at the angle $\theta_a$, and the inner ring holes (212b) may be clocked at the angle $\theta_b$.

With continued reference to FIG. 2D, according to an embodiment of the present disclosure, outer ring holes (212a) and the inner ring holes (212b) may be clocked at a relative non-zero offset. In other words, as shown in FIG. 2C, any two adjacent holes (212a) and (212b) may be positioned at, or separated by, a relative (non-zero and constant) angular distance, $\theta_{ab}$. According to a nonlimiting embodiment of the present disclosure, the angle, $\theta_a$, may be equal to the angle, $\theta_b$, such as $\theta_a = \theta_b$, $=\theta$. According to an embodiment of the present disclosure, the outer ring of holes (212a) may include a number of holes (e.g., 212a) that is equal to a number of holes (e.g., 212b) included in the inner ring of holes (212b). According to a nonlimiting embodiment of the present disclosure, the relative angular distance, $\theta_{ab}$, may be such as $\theta_{ab} = 0.5 = \theta$.

It is noted that by making the angular distance, $\theta_{ab}$, non-zero, such as to interleave the angular positions of the (equal number) holes (212a) and (212b), downstream azimuthal diffusion of the gas can be promoted by lowering an axial distance the gas must travel from an exit plane of the gas channel (210, e.g., top surface provides an exit plane for the holes) before combining azimuthally. According to an embodiment, a degree of symmetry in azimuthal diffusion may be based on the non-zero value of the angular distance, Oa. According to a preferred embodiment of the present disclosure, increased symmetry in the azimuthal diffusion may be provided by making $\theta_{ab} = 0.5 = \theta$.

Arrangement of the holes (212) according to the present disclosure is configured to promote azimuthal distribution of the gas around the gas distributor (200) that also serves as anode for the EP system. Accordingly, when combined with the triangular shape (225) of the gas diffuser (220) that promotes radial distribution of the gas, the gas distributor (200) according to the present teachings may allow control of azimuthal and radial distribution/diffusion of the gas. It is noted that although preferred embodiments according to the present disclosure may include symmetrical structures (e.g., 210, 215, 220, 225, symmetrical about a common centerline, e.g., $C_{220}$) for provision of highly symmetrical azimuthal and radial distribution/diffusion of the gas inside of the discharge chamber (e.g., 102) of the EP system, asymmetry in such structures may be advantageously used to control azimuthal and/or radial distribution/diffusion of the gas according to any desired profiles.

According to an embodiment of the present disclosure, the total number of holes (212), and therefore the sum of the total number of holes (212a) and (212b), may be based on a size of the gas distributor (200, e.g., circumferential length and/or total volume of the chamber 215) and/or size of the holes (212, e.g., combined openings cross section) for provision of a desired (total, combined) flow of gas. According to an embodiment of the present disclosure, the total number of holes and/or size of the holes may be based on a desired flow of the gas within the chamber (215) and/or out of the chamber (215). According to an embodiment of the present disclosure, an upper limit for the size and number of the holes (212) may be based on producing a total flow of gas within the chamber (215) such as the gas (azimuthally) diffuses throughout the volume of the chamber (215) before exhausting out of the chamber (215).

According to a nonlimiting embodiment of the present disclosure, each of the outer holes (212a) may be of a same size and each of the inner holes (212b) may be of a same size. According to a nonlimiting embodiment of the present disclosure, the size of the outer holes (212a) may be (slightly) larger (e.g., 2% to 5% larger) than the size of the inner holes (212b). According to an embodiment of the present disclosure, a ratio of the size of the outer holes (212a, e.g., diameter thereof) to the size of the inner holes (212b, e.g., diameter thereof) may be equal to a ratio of the radius, $r_a$, to the radius $r_b$, shown in FIG. 2B. It is noted that the difference in size of the holes (212a) and (212b) may promote downstream radial diffusion of the gas that exits the holes (212a, 212b) by lowering an axial distance the gas must travel from an exit plane of the gas channel (210, e.g., top surface provides an exit plane for the holes) before combining radially. It is further noted that the size of a hole may be based on a cross section provided by the hole and independent from the shape of the hole. Although the holes (212a) and (212b) may be of any shape, in a preferred embodiment according to the present disclosure the holes (212a) and (212b) have a circular shape/cross section, such as to promote increased symmetry in outflow/diffusion of gas.

Figure 3A:
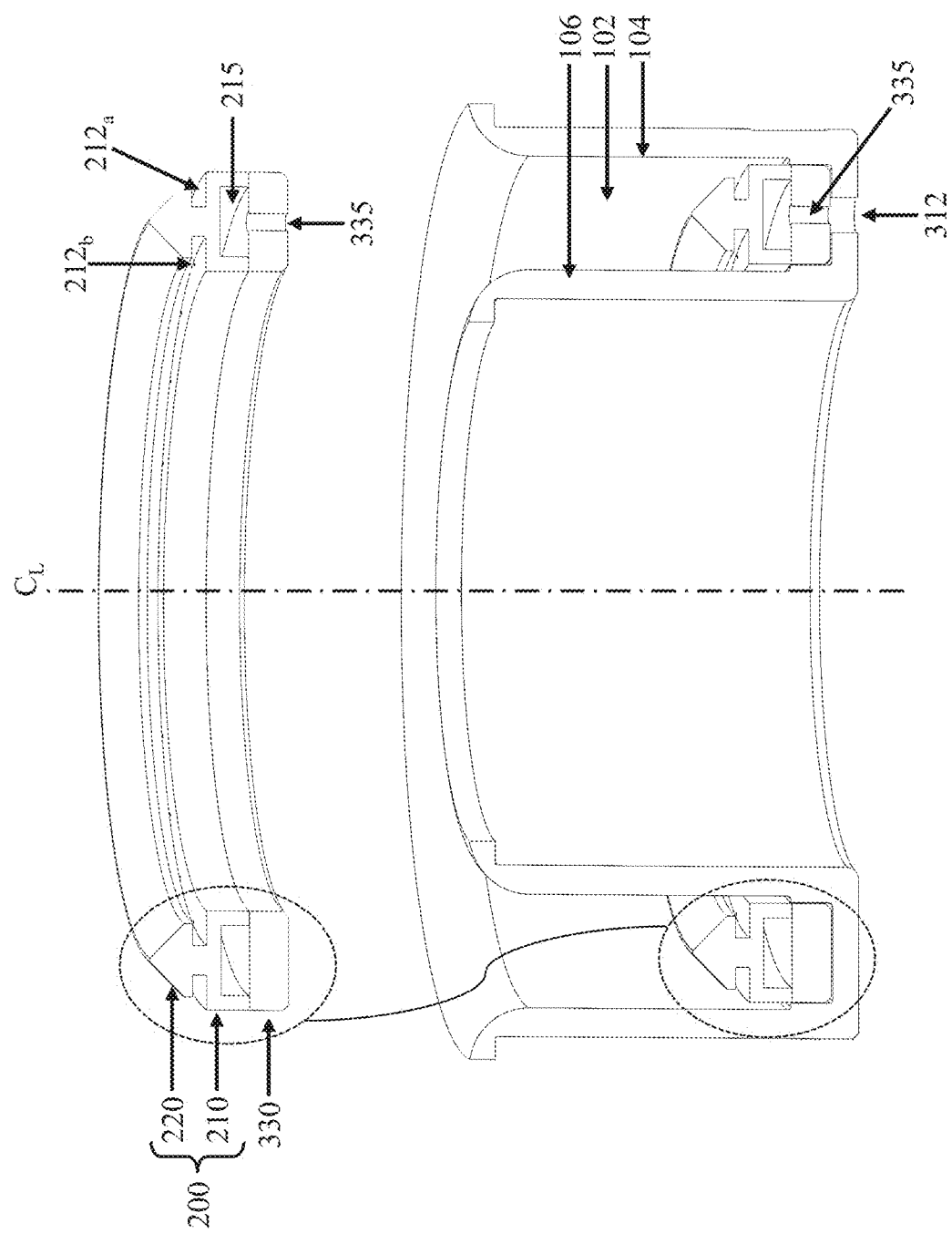
FIG. 3A shows (simplified) isometric views of the gas distributor of FIG. 2A and FIG. 2B mounted on a baseplate and fitted in a discharge chamber of an EP system.
Figure 3B:
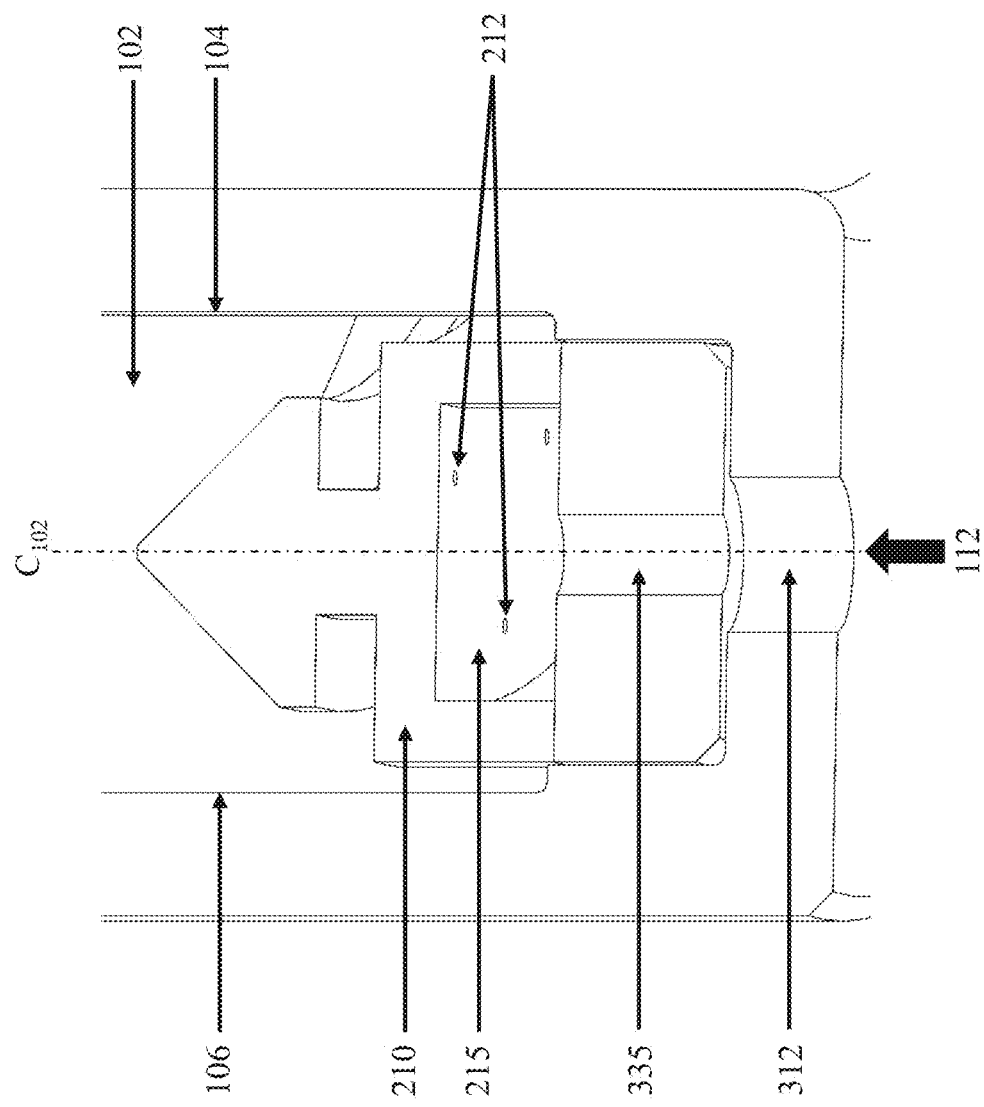
FIG. 3B shows further details of the gas distributor of FIG. 2A and FIG. 2B, including details related to input of gas into the gas distributor.

FIG. 3A shows (simplified) isometric views of the gas distributor (200) mounted on a baseplate (330) and fitted in a discharge chamber (102) of an EP system. As shown at the top of FIG. 3A, the baseplate (330, e.g., support ring) includes an annular shape/profile that corresponds to (e.g., matches) the annular/shape profile of the gas distributor (200). In particular, when the baseplate (330) is mated to the gas distributor (200), it closes the bottom of the hollow region (215, bottomless chamber/channel) to form an enclosed chamber/channel (215). As shown in FIG. 3A, the baseplate (330) may include at least one opening (335) for delivery of gas into the chamber (215). As shown at the bottom of FIG. 3A, and with further details in FIG. 3B, when fitted in the discharge chamber (102, including walls 104, 106), the opening (335) may align with a corresponding opening (312) arranged at a closed upstream base/bottom of the discharge chamber (102). In turn, the opening (312) may be coupled to an inlet (112, e.g., feed pipe, also shown in FIG. 1B) for delivery of (propellant) gas to the gas distributor (200). It is noted that based on FIG. 3A, it is clear that the respective exit planes of the outer holes (212a) and the inner holes (212b) are radially separated by an axial extension of the gas diffuser (220). Accordingly, gas outflow from the outer holes (212a) may remain separate from the gas outflow from the inner holes (212a) over an axial extension of the discharge chamber (102) that may include the neck (e.g., $225_N$, transition region) and an upstream portion of the triangular shape (e.g., 225) of the gas diffuser (220).

According to some embodiments of the present disclosure, functionality of the baseplate (330) shown in FIG. 3A may be provided by the base/bottom of the discharge channel (102), thereby removing the requirement for the baseplate (330) as an additional part. However, it is noted that such simplification may not be possible in all cases as the main functionality of the baseplate (330) is to provide gas seal within the chamber (215) at higher operating temperatures (e.g., above 1000° C.) of the anode. A main problem with operating anodes at such higher temperatures is related to gas leaks (e.g., exhausts) stemming from inadequate performance of the gas seal. In particular, welded steel is known to fail above 1000° C. and most brazed joints are known to fail above 1200° C. Teachings according to the present disclosure solve such problem by using graphite as the material for the anode (i.e., gas distributor 200) and directly adhering the graphite anode to either a graphite ring (e.g., the baseplate 330 made from graphite) or a graphite base of a discharge channel (e.g. 102) made from graphite, using graphite adhesive. Because a carbon-carbon bond provided by the graphite adhesive has an operating temperature range similar to that of graphite itself, safe operation of the anode at the higher temperatures can be provided. In other words, in cases where the discharge channel (e.g., 102) is not made from graphite, for example according to traditional implementations using boron nitride, to allow operation at the higher temperatures, the baseplate (330, made of graphite) may be used such as to provide the required gas seal of the gas distributor (200). On the other hand, in cases where the discharge channel is made from graphite, the baseplate (330, made from graphite) may not be needed as the gas seal can be made to the discharge channel itself (interface between the gas distributor and a base of the discharge channel that is made from graphite).

According to an embodiment of the present disclosure, the gas distributor (200) described herein may be fabricated from a single conductive material, including a metal material or a non-metal material. As previously noted in the present disclosure, the choice of such material may be based on a use case, including type of propellant, expected high temperatures at the anode, and/or thermal control/management features embedded in the EP system, which may dictate, for example, requirements for melting temperature and/or emissivity of the material.

Figure 4:
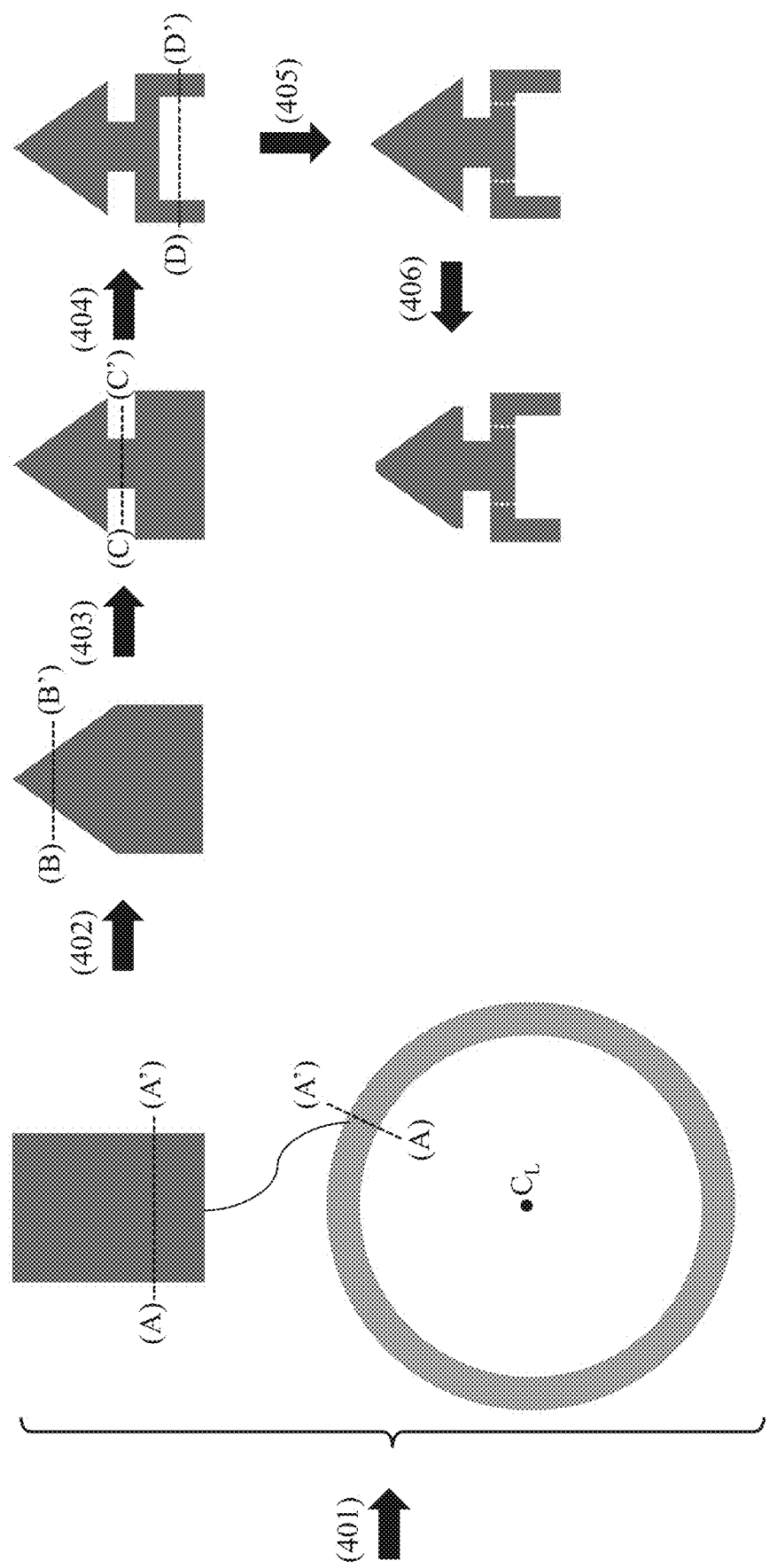
FIG. 4 shows various steps of a process for fabricating a gas distributor according to the present disclosure.

As previously described in the present disclosure and shown in the process steps of FIG. 4, all functional elements of the gas distributor (200), including elements (210, 212, 215, $215_N$, 220, 225) of FIG. 2A, may be fabricated/machined from a single (solid) annular shape (e.g., annulus, annular structure). Exemplary process steps shown in FIG. 4 include a step (401) for provision the annular structure/block made of a single conductive material (e.g., steel, graphite, silicon carbide, molybdenum, tungsten, etc.) having a desired profile (e.g., height, width, radius relative to a centerline $C_L$, cross section AA'). During a process step (402), a downstream region of the annular structure is cut, for example via an angled lathe, to provide a cross section (BB') according to a triangular shape (e.g., 225). During a process step (403), slots are made on inner and outer radius of the annular structure and in a (medial) region that may contain an upstream portion of the triangular shape, such as to provide a cross section (CC') according to a neck (e.g., 225$_N$) upstream the triangular shape. During a process step (404), a cylindrical block, e.g., annulus, is cut out from the bottom of the annular structure such as to provide a cross section (DD') according to a hollow region/chamber/channel (e.g., 215) upstream the neck. Finally, during a process step (405), holes are drilled axially through the cutout/hollow region at the bottom of the annular structure such as to provide an outer and an inner ring of holes (212a, 212b). An additional (optional) process step (406) may include finishing of the part, including removing sharp/pointy edges that may be of concern. It is noted that the sequence of the above-described process steps may be altered, for example, step (405) or (406) may be performed prior to step (404). When contrasting to complexity involved fabricating a conventional multi-layered gas distributor, a person skilled in the art may appreciate ease and simplicity provided by the described process steps, including requirement for only a lathe and a drill-press.

Alternate methods and techniques for fabricating the gas distributor (200) may include additive and/or subtractive manufacturing techniques (e.g., 3D printing) that can provide atomic bonds. This includes forming any two or more elements (e.g., 210, 212, 215, 215$_N$, 220, 225 of FIG. 2A) as a single monolithic structure, including forming the entirety of the gas distributor (200) as a single monolithic structure.

As used herein, a monolithic structure may refer to a three-dimensional structure comprising functional elements bonded to one another via atomic bonds of a material (or materials) that makes the structure. This may therefore include a single material structure formed via subtractive manufacturing, a single or multi material structure formed via additive manufacturing, or a combination of the two. Accordingly, a monolithic structure according to the present disclosure may not include any fasteners/bolts or welding/glue to form a three-dimensional shape of the structure. By reducing (e.g., integrating) a plurality of (functional) elements (e.g., 210, 212, 215, 215$_N$, 220, 225 of FIG. 2A) of a gas distributor (e.g., 200) to a single monolithic structure, enhanced thermal conductivity of the monolithic structure, and therefore of an EP system using such structure, may be provided.

The monolithic structure according to the present disclosure may be manufactured through a variety of methods, known generically as additive manufacturing methods, including but not limited to powder bed fusion, direct energy deposition, ultrasonic additive manufacturing, wire arc additive manufacturing, binder jetting, bound metal deposition, bound powder extrusion, etc. Teachings according to the present disclosure may take advantage of flexibility and scalability provided by the additive manufacturing methods presently available to provide functionality of a gas distributor as through a single material or a multi material monolithic structure.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The invention claimed is:

1. A gas distributor for an electric propulsion system, comprising:
   an annular structure with axial symmetry about a center axis, the annular structure comprising
   an upstream gas channel region comprising a circumferential hollow region and two sets of holes circumferentially arranged at two radial positions; and
   a downstream gas diffuser region comprising a triangular shaped radial cross section that radially extends through the two radial positions,
   wherein the circumferential hollow region axially extends through a bottom plane of the annular structure such as to expose a bottomless channel provided by the circumferential hollow region.

2. The gas distributor of claim 1, wherein:
   the two sets of holes are in fluidic communication with the circumferential hollow region.

3. The gas distributor of claim 1, wherein:
   each hole of the two sets of holes is an axial hole.

4. The gas distributor of claim 1, wherein:
   the two radial positions are contained within a radial extension of the triangular shaped cross section.

5. The gas distributor of claim 1, wherein:
   a radial extension of the circumferential hollow region is contained within a radial extension of the triangular shaped cross section.

6. The gas distributor of claim 1, wherein:
   a radial extension of the triangular shaped cross section is contained within a radial extension of the upstream gas channel region.

7. The gas distributor of claim 1, wherein:
the annular structure further comprises a transition region between the gas channel region and the gas diffuser region, and
a radial extension of the transition region is contained within a radial extension between the two radial positions.

8. The gas distributor of claim 1, wherein the two sets of holes comprises:
a first set of holes comprising a plurality of inner holes circumferentially arranged at an inner radial position of the two radial positions, and
a second set of holes comprising a plurality of outer holes circumferentially arranged at an outer radial position of the two radial positions.

9. The gas distributor of claim 8, wherein:
a number of holes of the first set of holes is equal to a number of holes of the second set of holes.

10. The gas distributor of claim 8, wherein:
an angular distance between any two adjacent holes of the first set of holes is constant, and
an angular distance between any two adjacent holes of the second set of holes is constant.

11. The gas distributor of claim 8, wherein:
an angular distance between each hole of the first set of holes and a corresponding adjacent hole of the second set of holes is constant.

12. The gas distributor of claim 8, wherein:
said angular distance is equal to half the angular distance between each hole of the first set of holes and a corresponding adjacent hole of the first set of holes.

13. The gas distributor of claim 8, wherein:
each hole of the plurality of inner holes is of a first size, and
each hole of the plurality of outer holes is of a second size.

14. The gas distributor of claim 13, wherein:
the second size is greater than the first size.

15. The gas distributor of claim 1, wherein:
the annular structure is a monolithic structure.

16. The gas distributor of claim 15, wherein:
the monolithic structure is made from a single conductive material.

17. The gas distributor of claim 16, wherein:
the single conductive material includes one of graphite, silicon carbide, steel, molybdenum, or tungsten.

18. An electric propulsion (EP) system, comprising:
a gas distributor according to claim 1, wherein during operation of the EP system, the gas distributor is configured to
provide azimuthally and radially symmetrical propellant gas into a discharge chamber of the EP system, and
provide functionality of an anode for generation of an accelerating electric field in the discharge chamber.

19. The electric propulsion (EP) system of claim 18, wherein:
the discharge chamber is made from graphite,
the annular structure of the gas distributor is a monolithic structure made from graphite,
the monolithic structure is bonded to a base of the discharge chamber via a graphite adhesive that provides carbon to carbon bonds.

20. A gas distributor for an electric propulsion system, comprising:
an annular structure with axial symmetry about a center axis, the annular structure comprising
an upstream gas channel region comprising a circumferential hollow region and two sets of holes circumferentially arranged at two radial positions; and
a downstream gas diffuser region comprising a triangular shaped radial cross section that radially extends through the two radial positions
wherein
the annular structure is a monolithic structure made from graphite, and
the gas distributor further includes an annular baseplate made from graphite that is adhered to the bottom of the monolithic structure via a graphite adhesive that provides carbon to carbon bonds, the annular baseplate configured to close the circumferential hollow region of the upstream gas channel.

21. A method for fabricating a gas distributor for an electric propulsion (EP) system, comprising:
providing an annular block made from a single material, the annular block comprising an axial symmetry about a center axis and a square radial cross section axially extending from a bottom upstream end to a top downstream end of the annular block;
cutting the top upstream end of the annular block at an angle, thereby forming a triangular radial cross section;
cutting inner and outer slots in a medial region of the annular block, thereby forming a rectangular cross section having a radial extension that is contained within a radial extension of the triangular radial cross section;
cutting out an annulus from the bottom upstream end of the annular block, thereby forming a circumferential hollow region having a cross section that contains the radial extension of the rectangular cross section, the circumferential hollow region axially extending through the bottom upstream end of the annular block such as to expose a bottomless channel provided by the circumferential hollow region;
drilling holes through the circumferential hollow region, thereby forming an inner ring of holes and an outer ring of holes; and
based on the drilling, finalizing the fabricating of the gas distributor.

22. The method according to claim 21, further comprising:
fitting the gas distributor into an upstream region of a discharge chamber of an EP system, thereby closing the bottom upstream end of the gas distributor; and
during operation of the EP system
feeding propellant gas into the hollow region of the gas distributor, thereby evenly azimuthally spreading the propellant gas within the hollow region;
based on the evenly azimuthally spreading, exhausting the propellant gas into the upstream region of the discharge chamber through the inner and outer rings of holes;
based on the exhausting, subjecting a corresponding flow of propellant gas to a profile of the gas distributor provided by the rectangular cross section and the triangular cross section as the propellant gas flows in a downstream direction; and
based on the subjecting, generating a high azimuthal and radial symmetry of the flow of propellant gas in a region of the discharge chamber near the top downstream end of the gas distributor.

* * * * *